UNITED STATES PATENT OFFICE.

CHARLES F. LAWTON, ARTHUR W. LAWTON, AND ALBERT L. LAWTON, OF WASHINGTON, DISTRICT OF COLUMBIA.

PAINT.

SPECIFICATION forming part of Letters Patent No. 593,670, dated November 16, 1897.

Application filed August 4, 1893. Serial No. 482,361. (No specimens.)

*To all whom it may concern:*

Be it known that we, CHARLES F. LAWTON, ARTHUR W. LAWTON, and ALBERT L. LAWTON, citizens of the United States, residing at Washington, District of Columbia, have invented certain new and useful Improvements in Paints, of which the following is a specification.

Our invention has for its object the production of a water-mixed paint which will become insoluble in water as soon as the paint is dry, be capable of receiving many different colors, and present greater resistance to the effects of rain, sunshine, and frost than ordinary oil-mixed paints. To begin with, we take the oxid, hydrate, carbonate, chlorid, or oxychlorid or oxalate of lead, or the oxid or hydroxid of calcium, strontium, barium, magnesium, zinc, or copper, and should it be lead that in this particular instance is to be used instead of any of the other metals we take of the lead compound ten pounds and mix it with from five to twenty pounds of very finely-ground carbonate of lime, together with such colors as are desired, and in quantity according to the nature of the color and depth of tint wanted, varying the quantity of carbonate of lime according to these conditions.

In making the foregoing mixture, whatever metallic oxids or salts be used, we so compound it that from ten to fifty per cent. of the solid or insoluble ingredients shall be in the condition of hydroxid or hydrated silicate of one or more of the metallic oxids or metallic salts present. For instance, a compound can be made of ten pounds of carbonate of lead, five pounds of zinc hydroxid, $Zn(OH)_2$, or hydrated zinc silicate, $(ZnSiO_3+2H_2O,)$ and twenty pounds of very finely-ground carbonate of lime. These ingredients, together with coloring-matter, should some other color than white be wanted, are thoroughly mixed with ten to fifteen pounds of water and then with fifteen to thirty pounds of a three to five per cent. water solution of silica made by the well-known diffusion or dialysis process of Graham. This last ingredient being added and well stirred in the whole mixture is then ground through a paint-mill, which finishes it. This compound so made and ground we will call for convenience "No. 1." It is a creamy paint-like liquid of variable consistence according to the amount of water and the nature of the insoluble ingredients and colors that it contains. The neutral solution of silica used in compound No. 1 is a thin very mobile solution and does not turn to the coagulated condition until some time after it has been mixed with the other ingredients. This is not to be confounded with the transparent zinc-ammonia soda silicate used in mixture No. 2.

Compound or mixture No. 2 is made by taking an eight to sixteen per cent. solution in water of potash or soda silicate, singly or mixed, and adding to twenty pounds of this alkaline-silicate solution one-half of a pound to one pound of a strong solution of hydrated zinc oxid in strong aqua-ammonia. This solution of zinc in aqua-ammonia will produce a white bulky clot in the alkaline-silicate solution when first added to it, but by vigorous stirring the clot of compound zinc sodium ammonium silicate so produced dissolves in the soda or potash silicate and ammonia, giving a clear transparent solution of a compound alkaline and zinc silicate, the compound silicate being kept in solution by the ammonia present and by the excess of potash or soda silicate.

The reaction which ensues when the compound of zinc oxid and ammonia is added to the silicate of soda or of potash in solution of mixture No. 2 may be expressed thus:

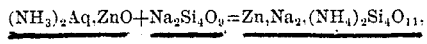

or

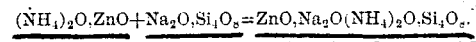

As carbonate of ammonia dissolves oxid of zinc, and as caustic ammonia dissolves carbonate of zinc, (and as carbonates, silicates, and borates react with other compounds in a manner having so many points of resemblance that chemists have placed carbonic, silicic, and boric acids in a group,) it is possible that the ammonia present dissolves the silicate of zinc produced or the compound silicate of zinc and soda, whichever it may be, when the solution of zinc oxid in ammonia is first added to the silicate-of-soda solution.

Compounds Nos. 1 and 2, though used for painting the same surface, must be kept in separate vessels, and compound No. 1 must be well stirred up from the bottom with a stick or paddle just before using.

To apply the paint the operation is as follows: Should a thin coat only be desired, enough water is added to compound No. 1 to make it quite thin, and then with a brush or atomizer the liquid is evenly applied over the surface of brick, wood, stone, plaster, or metal to be painted and allowed to dry. After mixture No. 1 has dried on the surface to which it has been applied it is gone over with a coat of the thin liquid No. 2, which quickly penetrates the dry porous coat of No. 1, with which it reacts chemically, producing a hard, smooth, tough, adherent compound totally insoluble in water—hot or cold.

If lead carbonate, zinc hydrate, zinc silicate, and calcium carbonate be some of the ingredients of coat No. 1, then possibly (we cannot assert with certainty) the reaction will be as follows:

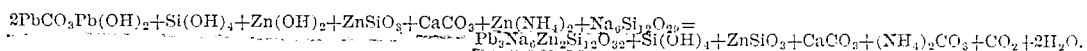

If calcium hydroxid replace the lead in the first coat, then the reaction may be—

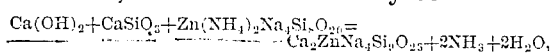

the calcium silicate represented in the first member of the equation being produced by the water solution of silica coming in contact with the calcium hydrate in mixing the materials for the first coat. Where there is a mixture of basic oxids in the first coat, then there may be a mixed reaction, but always, we believe, approximating the formulas given. In effecting the decomposition of the sodium chlorid, as before mentioned, in a water solution of silica by means of lead oxid without the use of heat, the reaction may be expressed thus:

The lead chlorid so produced is difficultly soluble in water, and its presence in the paint is a matter of no serious consequence. If lead oxychlorid should be produced, it would be still less soluble. In this case the reaction may be indicated by—

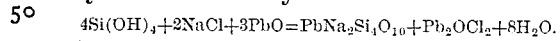

Should a thick coat of paint be desired, less water is used in No. 1, and instead of applying No. 1 first to the surface to be painted, as in the case just described, No. 2 is used for the first coat. This quickly dries and after it is dry a coat of No. 1 is laid over it, and after this second coat is dry a coat of No. 2, making the third coat, is laid over No. 1, which finishes the painting.

Should the surface to be painted be of a very porous absorbent nature, then to make the work look even or free from spattiness it will be necessary to grind the transparent colorless No. 2 compound with material to give it body and then the color desired for the finished paint. This can be done without difficulty if care is used to avoid those ingredients which produce setting of the soluble silicate of the No. 2, but which setting ingredients are a necessary constituent of No. 1.

The materials for giving body and color to No. 2, which can be used without setting it, are finely-ground carbonate of lime, sulfate of barium, magnesia silicate, calcium silicate, zinc silicate, &c. For colors which will not produce setting in No. 2 there can be used peroxid of iron, green and blue ultramarine, red lead, and nearly all the variously-colored smalts or glass strongly colored by being fused with various metallic oxids and then reduced to fine powder.

Instead of using carbonate of lead in compound No. 1 as the setting material to render the paint insoluble by the reaction between coats Nos. 1 and 2, other compounds and salts of lead can be use, such as chlorid and oxychlorid of lead, or chromate, manganate, fluorid, sulfate, &c., of lead can be used, or the lead compounds in No. 1 can be partly or entirely replaced by oxid, carbonate, or chromate of zinc, or by ferrous carbonate, or by copper compounds, such as oxid, carbonate, or arsinicate of copper, or by those barium compounds which are nearly insoluble, but will react with an alkaline silicate. Compound No. 2, however, as has been before stated, must not be mixed with any substance like the above which would react with the soluble silicate in No. 2 before it could be applied to the surface to be painted.

The object in having some of the insoluble ingredients in No. 1 in the condition of hydroxid and hydrate is because these hydrous compounds of metallic oxids and salts give a certain plasticity and smoothness to the paint and also cause these compounds to react more readily with the soluble silicate of No. 2 after No. 2 has been painted over No. 1.

The object in adding the water solution of silica to No. 1 is to coat each little particle of solid matter in No. 1 with a coat of gelatinous silica insufficient in quantity to saturate the lead or fixing substance in No. 1, but sufficient to bind the particles of coat No. 1 together after the coat has dried onto the surface to which it is applied. The quantity of this gelatinous silica is not sufficient after the coat has become dry to stop the minute pores in the dried coat, so as to prevent the penetration of the soluble silicate of coat No. 2, but it is sufficient to bind coat No. 1, so that it will not drag off or mix up in the brush when applying No. 2.

When the neutral or non-alkaline water solution of silica is first mixed with the other ingredients of No. 1, it gelatinizes at once if the ingredients are dry and thickens the liquid greatly, but if the insoluble matters are previously ground with a little water the silica solution will take some time to gelatinize.

In some cases it is not necessary to dialyse out the sodium chlorid produced by the hydrochloric acid's action on the alkaline silicate as in making a neutral water solution of silica by the process of Graham, but the alkaline silicate can be diluted with enough water to prevent precipitation and then rendered neutral by the hydrochloric and mixed with the other ingredients of No. 1 directly. Where oxid of lead is one of the ingredients of No. 1, the sodium chlorid introduced in the neutral silica solution is decomposed by the lead with production of lead chlorid and caustic soda, which react with the hydrous silica to produce an insoluble double silicate of lead and soda with another portion of the lead oxid.

The object in using the ammonia solution of zinc in compound No. 2 is for the reason that after this compound has been applied and the ammonia has evaporated all of the potash or soda silicate left undecomposed by contact with the ingredients of coat or compound No. 1 is rendered insoluble by the loss of its ammonia and the production of an insoluble compound silicate of zinc, soda, and such other bases as may be used. The function of the ammonia is to hold the silicate of zinc or the double silicate of zinc and soda in solution until the second coat (mixture No. 2) can be applied, after which, by vaporization and escape of the ammonia, the insoluble treble or quadruple silicate (according to the number of bases in the first coat) is left behind.

Where the paint is required to be very hard and a perfectly white color is not necessary, three-fourths of the carbonate of lime, sulfate of barium, silicate of lime, or other body-giving material in No. 1 can be replaced by finely-ground infusorial silica or diatomaceous marl; but when this infusorial silica is used the quantity of it required to replace the other ingredients named is much smaller than the lime or barium compounds required. This infusorial silica from some cause produces a much greater thickening of soluble silicate solutions than do most substances, and if too much of it were used in compound No. 1 it would hinder the proper penetration of the soluble silicate of compound No. 2 into dried coat of No. 1.

We are aware of British patent to Blane, No. 9,803 of 1884, in which it is proposed to bring slag and acid to the consistence of a jelly, which after the acid is removed is added to paints, varnishes, &c. By itself it is of no use and is not capable of being applied (by a brush, for instance) as a separate and distinct coating and has no chemical reaction with the paint or varnish in which it is mixed, but unites therewith mechanically. By its mixture with paints or varnishes its porosity would be destroyed.

We are also aware of British patent to Ellis, No. 2,645 of 1862, in which it is proposed to render gelatinous silica soluble by means of a solution of silicate of soda or of potash, or both; but this solution, however large the proportion of silica, is always a silicate of the alkali used and always reacts alkaline. We use a neutral solution of silica and its resulting gelatinous silica as a binding material for our first mixture or coat and not, as does Ellis, to dissolve again to produce an alkaline-silicate solution rich in silica.

Having thus described our invention, what we claim is—

1. The herein-described paint composition consisting of insoluble metallic oxid or salt mixed with a neutral or non-alkaline solution of silica, said composition being capable of application without admixture with other substances, by means of a brush, to the surface to be painted.

2. The herein-described paint composition consisting of insoluble metallic oxid or salt, part of which is in a condition of a hydroxid or hydrate, mixed with a neutral or non-alkaline solution of silica, said composition being capable of application without admixture with other substances, by means of a brush, to the surface to be painted.

3. The herein-described setting compound consisting of an alkaline-silicate solution containing zinc oxid and ammonia.

4. A paint comprising two compounds designed to act chemically one upon the other, the first compound consisting of insoluble metallic oxid or salt mixed with a neutral non-alkaline solution of silica; and the second consisting of a zinc-sodium-ammonium-silicate solution all substantially as described.

5. The process for producing a painted surface which consists in combining with metallic oxid or salt when in suspension in water, a non-alkaline solution of silica in water, and applying to this composition after application, another compound comprising a zinc-sodium-ammonium-silicate solution substantially as described.

6. In the manufacture of mineral paint free from organic matter, the process of decomposing sodium chlorid in a neutral water solution of silica, which consists in bringing it into contact with a lead oxid, substantially as set forth.

In witness whereof we hereunto set our hands in the presence of two witnesses.

CHARLES F. LAWTON.
ARTHUR W. LAWTON.
ALBERT L. LAWTON

Witnesses:
WALTER S. DODGE.
HORACE A. D